United States Patent Office 2,974,085
Patented Mar. 7, 1961

2,974,085
3-TRICHLOROMETHYL-THIO BENZOXAZOLONES

Ernst A. Bartels, Wiesbaden, Berthold Brähler and Johannes Reese, Wiesbaden-Biebrich, and Rolf Zimmermann, Wiesbaden, Germany, assignors to Chemische Werke Albert, Wiesbaden-Biebrich, Germany, a corporation of Germany No Drawing. Filed Oct. 20, 1958, Ser. No. 768,011

Claims priority, application Germany Oct. 31, 1957

11 Claims. (Cl. 167—33)

This invention relates to new derivatives of benzoxazolone and to their use as parasiticidal agents, and especially as fungicides where they are superior to other known benzoxazolones.

It is an object of our invention to produce new trichloromethyl-thio derivatives of benzoxazolones.

It is a further object of our invention to produce superior fungicidal compositions.

It is a still further object of our invention to employ trichloromethyl-thio derivatives of benzoxazolones as superior fungicides.

Various other objects and advantages of our invention will appear as this description proceeds.

We have found that certain derivatives of benzoxazolones are biologically highly effective substances which may be used to special advantage as fungicides in the field of parasite control. The effective substances correspond to the following general structural formula:

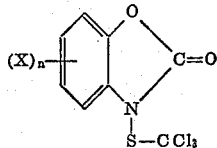

wherein X represents substituents on the aromatic ring, particularly selected from the group consisting of halo, nitro and aliphatic hydrocarbyl containing 1 to 6 carbon atoms, and $n$ is an integer from 0 to 3.

The benzoxazolones are produced according to known methods. The introduction of the trichloromethyl-thio radical at the nitrogen atom may be accomplished by reacting perchloromethyl-mercaptan with suitable benzoxazolones in the presence of acid-binding agents, in accordance with the following reaction formula:

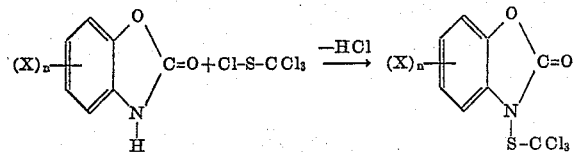

While it is known that cyclic imides of dicarboxylic acids may readily be condensed with perchloromethylmercaptan, this reaction has heretofore not been carried out with benzoxazolones.

The above-mentioned trichloromethyl-thio derivatives of benzoxazolone particularly exhibit fungicidal properties. It is known that benzoxazolone itself exhibits a good fungistatic effect. Among a great number of investigated derivatives, other than those according to the present invention, benzoxazolone proved to be the most effective, as reported in the periodical "Die Naturwissenschaften," 1956, page 281.

The plant compatibility of the new active agents is excellent. This is probably due to the fact that certain benzoxazolones are products of plant metabolism. The trichloromethyl-thio compounds are marked by a low vapor pressure, which is of advantage for the mode of application. Quite generally, they differ from known trichloromethyl-thio compounds in that the base compounds themselves exhibit a considerable fungicidal activity, as previously stated.

For use as parasiticidal agents the products according to the present invention may be admixed with wetting agents, fillers, carriers, solvents, etc., depending upon the requirements of the particular mode of use. They may also be employed together with other known fungicides, such as the trichloromethyl-thio derivative of tetrahydrophthalimide, known as "Captan," the known metal salts of ethylene-bis-dithiocarbamic acid, copper-containing agents or sulfur-containing preparations, or the like.

The following examples will further illustrate our invention and enable others skilled in the art to completely understand our invention. However, it is to be understood that these examples are illustrative only and not to be construed as limitations on our invention.

Example I 5 parts by weight of benzoxazolone were dissolved in 81.5 parts by volume of 0.5 N sodium hydroxide, and then a solution of 7.43 parts by weight of perchloromethyl-mercaptan in 50 parts by volume of benzene was added thereto over a period of 5 minutes, accompanied by stirring. After 2 hours the reaction mixture was filtered on a vacuum filter, the benzene phase was dried over sodium sulfate and evaporated to dryness in a vacuum. The dirty gray raw product was finally recrystallized from ligroin. This compound has the structural formula

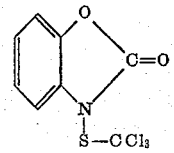

Melting point: 103–104° C.

$C_8H_4O_2NSCl_3$ (284.5)—Calculated: N 4.93%; S 11.25%; Cl 37.45%. Found: N 5.32%; S 10.96%; Cl 36.51%.

This substance prevents the germination of *Alternaria tenuis* when applied in a quantity of $2\gamma/cm.^2$ and observed over a period of 24 hours.

Example II 3 parts by weight of 6-bromo-benzoxazolone were dissolved in 28 parts by volume of 0.5 N sodium hydroxide. Thereafter, a mixture of 2.59 parts by weight of perchloromethyl-mercaptan with 30 parts by volume of benzene was stirred into the solution over a period of 5 minutes. After 2 hours the organic phase was separated, dried over sodium sulfate, and the solvent was evaporated. Upon recrystallizing the evaporation residue from ligroin, a product having a melting point of 102°–105° C. was obtained. This compound has the structural formula

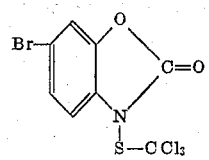

In the spore germination test against *Alternaria tenuis* the $DL_{100}$ was $0.6\gamma/cm.^2$ with an observation period of 24 hours.

Example III 10 parts by weight of 6-nitro-benzoxazolone were dissolved in 108 parts by volume of 0.5 N sodium hydroxide, and then 100 parts of water were added thereto. Thereafter, a solution of 10.04 parts by weight of perchloromethyl-mercaptan in 100 parts by volume of benzene were added dropwise over a period of 5 minutes, accompanied by stirring, whereupon a yellow precipitate formed. After two hours of standing the mixture was filtered on a vacuum filter, and the organic phase was evaporated in a vacuum. The combined raw products were recrystallized from ligroin, yielding a substance having a melting point of 138–140° C. The compound has the structural formula

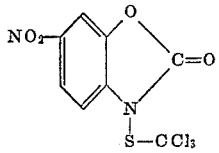

*Example IV*

A solution of 14.8 parts by weight of 5-tertiary butyl-benzoxazolone-(2) in 155 parts by volume of 0.5 N sodium hydroxide was diluted with 100 parts by weight of water. Thereafter, a solution of 14.4 parts by weight of perchloromethyl-mercaptan in 300 parts by volume of benzene was added dropwise while maintaining the mixture at 5° C. The reaction mixture was then stirred for 3 hours at 10° C., whereupon the benzene phase was separated, dried and evaporated in a vacuum. The evaporation residue set up into crystals upon cooling; it was then suspended in 50 cc. of ligroin and the suspension was filtered on a vacuum filter. The melting point of the crystals was 87–90° C. The sulfur content was found to be 9.3%, as against the calculated value of 9.4%. This compound has the structural formula

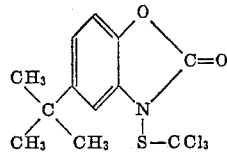

*Example V*

4.1 parts by weight of 5,7-dichloro-benzoxazolone-(2) were reacted with 3.7 parts by weight of perchloromethyl-mercaptan in 50 parts by volume of benzene in the presence of 40 parts by volume of 0.5 N sodium hydroxide at a temperature of 5–10° C. After no more perchloromethyl-mercaptan could be detected, the reaction mixture was worked up as in Example IV. Upon recrystallization from a mixture of ligroin and benzene, crystals having a melting point of 105–110° C. were obtained. This compound has the structural formula

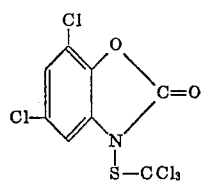

The substance very effectively prevents the germination of *Alternaria tenuis*.

*Example VI*

5 parts by weight of 6-chloro-benzoxazolone-(2) were dissolved in 28 parts by volume of 0.5 N sodium hydroxide. Thereafter a mixture of 100 parts by volume of benzene and 5.45 parts by weight of perchloromethyl-mercaptan was added dropwise over a period of 5 minutes while maintaining the mixture at 5° C. After 2 hours the organic phase was separated, dried over sodium sulfate, and evaporated in a vacuum. Upon recrystallization from ligroin, a grey powder having a melting point of 102–105° C. was obtained. The compound has the structural formula

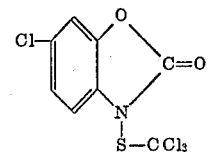

and prevents the germination of *Alternaria tenuis* when applied in a quantity of 0.8 γ/cm.$^2$ and observed over a period of 24 hours.

*Example VII*

2.38 parts by weight of x,x,x-trichloro-benzoxazolone-(2) (obtained by chlorination of benzoxazolone-(2) and having a melting point of 260–262° C.) dissolved in a mixture of 20 parts by volume of 0.5 N sodium hydroxide, 1 part by volume of a 10% solution of sodium carbonate and 70 parts by weight of water were stirred and cooled at 5° C. Thereafter a solution of 1.86 parts by weight of perchloromethylmercaptan in 50 parts by volume of benzene was added while maintaining the mixture at the same temperature. After stirring for 1.5 hours, the reaction mixture was worked up as described in Example VI. Upon recrystallization of the solid raw product, white crystals having a melting point of 215–217° C. were obtained. The product has the structural formula and prevents the germination of *Alternaria tenuis* when applied in a quantity of 2γ/cm.$^2$ and observed over a period of 24 hours.

*Example VIII*

A solution of 9 parts by weight of 5,6-dimethyl-benzoxazolone-(2) in 100 parts by volume of 0.5 N sodium hydroxide and 54 parts by volume of water was combined with a mixture of 10.2 parts by weight of perchloromethyl-mercaptan and 180 parts by volume of benzene, over a period of 5 minutes and maintaining the mixture at 10° C., and then stirred for 1.5 hours at the same temperature. Thereafter the reaction mixture was worked up as described. The red-brown raw product was recrystallized from ligroin and gave sand-coloured crystals having a melting point of 123.5–126.5° C. The sulfur content was found to be 9.9%, as against the calculated value of 10.22%. This compound has the structural formula

*Example IX*

4.3 parts by weight of 5,7-dimethyl-benzoxazolone-(2) were dissolved in 52.6 parts by volume of 0.5 N sodium hydroxide and 26 parts by volume of water. Thereafter a mixture of 4.87 parts by weight of perchloromethyl-mercaptan and 130 parts by volume of benzene was added over a period of 10 minutes and while stirring. During the adding the temperature was raising from 10° to 16° C. When all perchloromethyl-mercaptan was added the reaction mixture was further stirred over 3 hours at a temperature of 10° C. and thereafter worked up as described in Example VI. After recrystallization of the raw product from ligroin a crystallized powder having the melting point of 109-115° C. was obtained. The compound has the structural formula

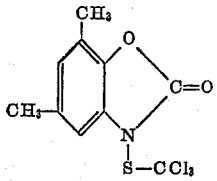

While we have given certain specific embodiments of our invention, it is readily apparent that changes and modifications may be made therein without departing from the spirit of the present invention or the scope of the following claims.

We claim:
1. A benzoxazolone having the formula

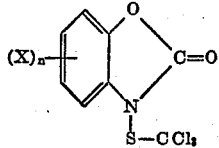

wherein X is selected from the group consisting of halo, alkyl containing 1 to 6 carbon atoms and nitro groups, and $n$ is an integer from 0 to 3.

2. 3-trichloromethyl-thio-benzoxazolone-2 having the formula

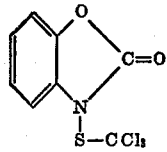

3. 6-bromo-3-trichloromethyl-thio-benzoxazolone-2 having the formula

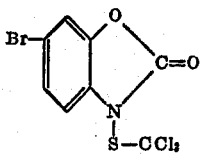

4. 6-nitro-3-trichloromethyl-thio-benzoxazolone-2 having the formula

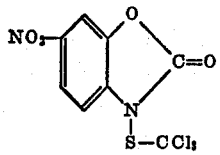

5. 5-tert. butyl-3-trichloromethyl-thio-benzoxazolone-2 having the formula

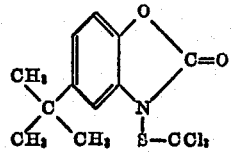

6. 5,7-dichloro-3-trichloromethyl-thio-benzoxazolone-2 having the formula

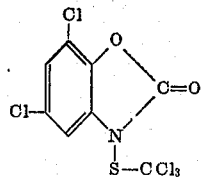

7. The method of inhibiting germination of fungi which comprises contacting said fungi with a benzoxazolone having the structural formula

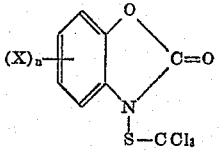

wherein X is selected from the group consisting of halo-, nitro- and alkyl with 1 to 6 carbon atoms, in an amount sufficient to produce inhibition of germination.

8. 6-chloro-3-trichloromethyl-thio-benzoxazolone-(2) having the formula

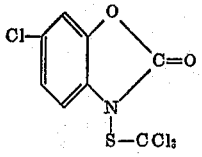

9. Trichloro-3-trichloromethyl-thio-benzoxazolone-(2) having the formula

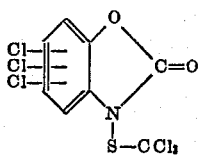

10. 5,6-dimethyl-3-trichloromethyl-thio-benzoxazolone-(2) having the formula

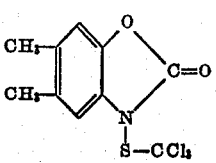

11. 5,7-dimethyl-3-trichloromethyl-thio-benzoxazolone-(2) having the formula

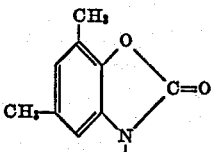

References Cited in the file of this patent
UNITED STATES PATENTS

| | | |
|---|---|---|
| 2,553,770 | Kittleson | May 22, 1951 |
| 2,553,775 | Hawley et al. | May 22, 1951 |
| 2,856,410 | Kittleson et al. | Oct. 14, 1958 |
| 2,922,794 | Model et al. | Jan. 26, 1960 |

OTHER REFERENCES

Frear et al.: J. of Economic Entomology, vol. 40, pp. 736-741 (1947).